United States Patent
Bradley, Jr.

[11] Patent Number: 5,967,534
[45] Date of Patent: Oct. 19, 1999

[54] ADJUSTABLE POSITION HANDLE ASSEMBLIES FOR SNOWMOBILE

[76] Inventor: Robert F. Bradley, Jr., P.O. Box 59404, Renton, Wash. 98058

[21] Appl. No.: 08/427,237

[22] Filed: Jun. 13, 1995

Related U.S. Application Data

[63] Continuation-in-part of application No. 08/229,201, Apr. 18, 1994, abandoned.

[51] Int. Cl.$^6$ .............................. B62B 3/00; B62M 27/02
[52] U.S. Cl. .................... 280/47.371; 180/190; 16/111 R
[58] Field of Search .......................... 280/47.315, 47.34, 280/47.36, 47.371, 293, 655, 655.1; 180/186, 190; 16/111 R; 403/59, 61

[56] References Cited

U.S. PATENT DOCUMENTS

| | | | |
|---|---|---|---|
| 2,619,360 | 11/1952 | Alter | 280/42 |
| 5,674,165 | 10/1997 | Cohen et al. | 482/127 |
| 5,725,282 | 3/1998 | Masseth, Jr. et al. | 299/39.3 |

*Primary Examiner*—Lanna Mai
*Assistant Examiner*—Faye M. Fleming
*Attorney, Agent, or Firm*—Robert W. Jenny

[57] ABSTRACT

Handles attachable to a snowmobile and stowable/extendable and angularly adjustable. In a preferred embodiment the handles, when extended, extend rearwardly from the snowmobile and are positioned so that grips on the extended ends of the handles are generally at hand height of a standing person. The handles make it possible to lift and maneuver the rear end of the snowmobile with significantly less force than needed for handling the snowmobile directly. When stowed, the handles are locked in the stowed state. The attachment of the handles to the snowmobile allows angular adjustment of the positions of the handles relative to the snowmobile to make the handles more useful and accessible when the snowmobile is in an awkward position. The handles may be dismounted and used in attachment apparatus at the forward end of the snowmobile, the apparatus being built in or added on.

3 Claims, 2 Drawing Sheets

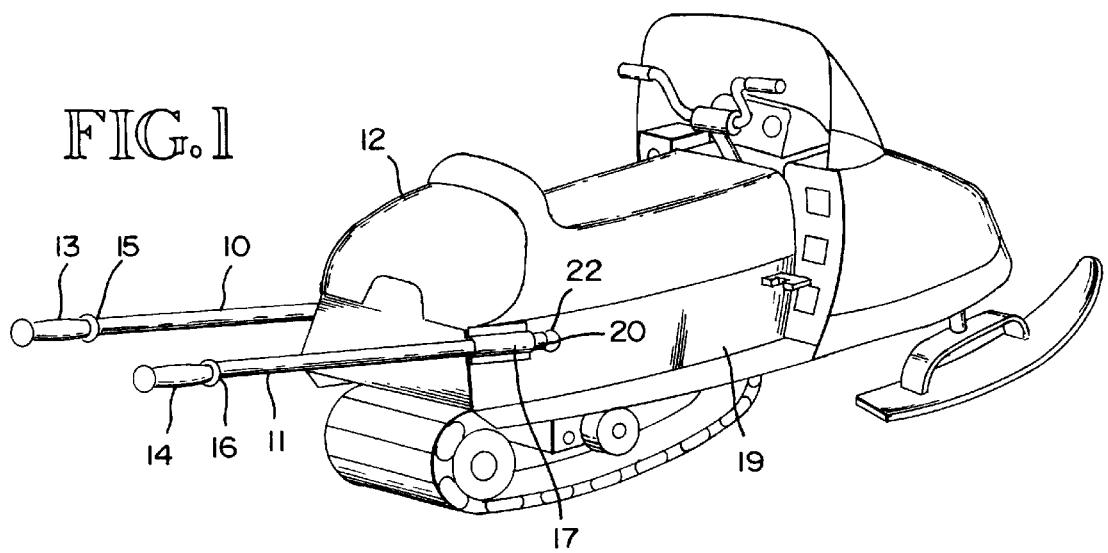
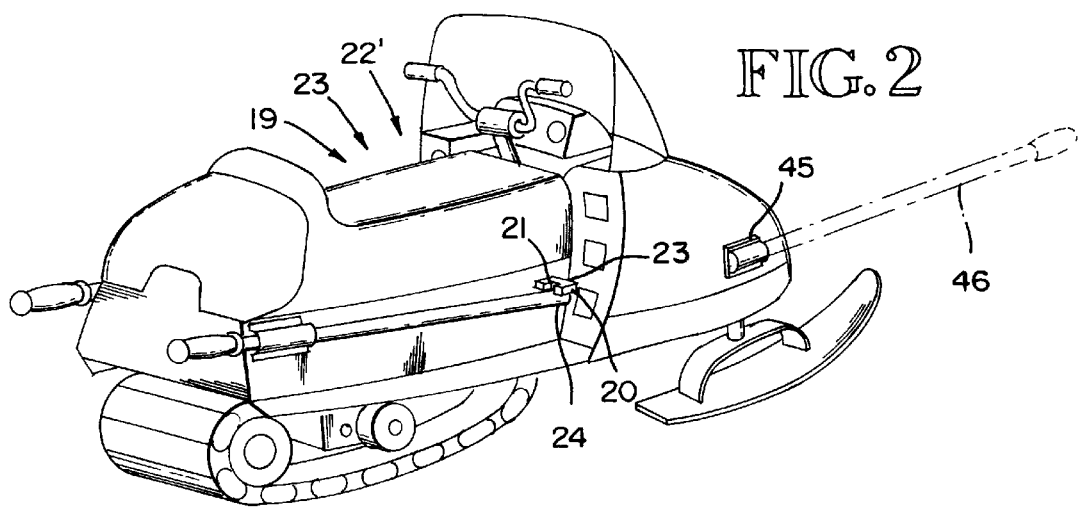
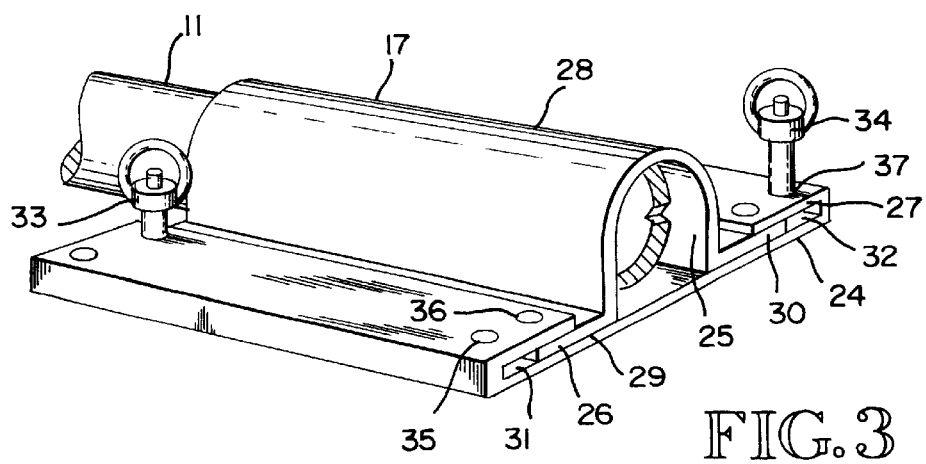

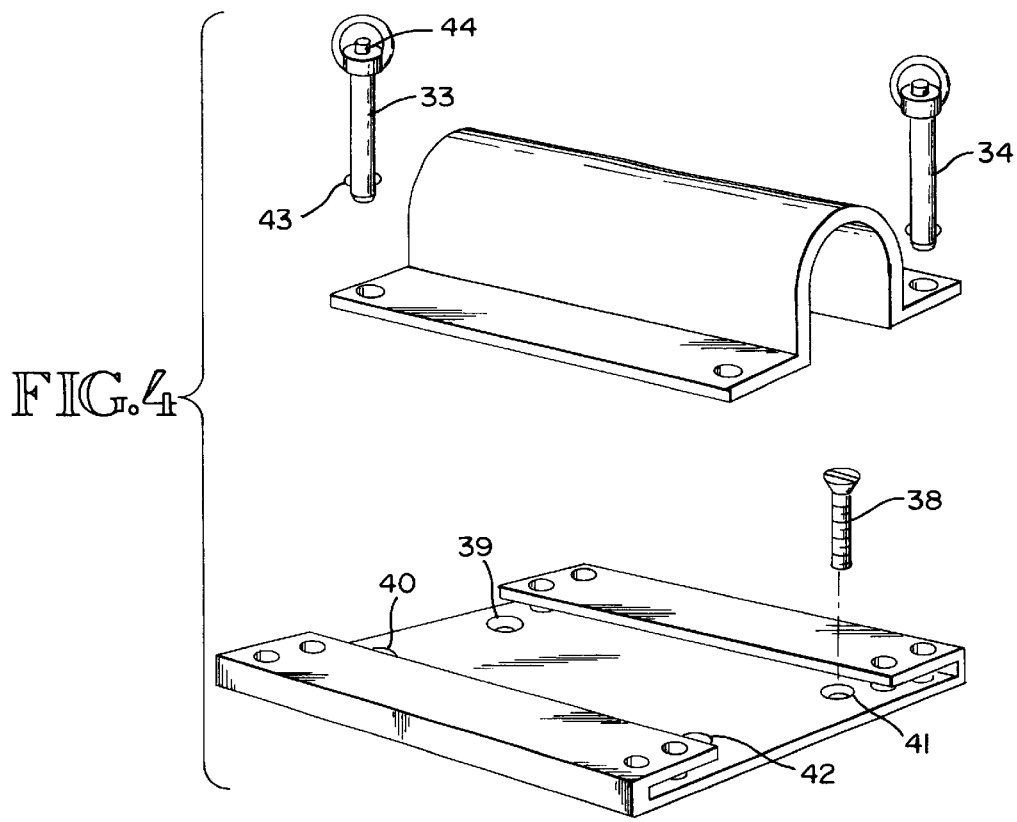
FIG. 4
FIG. 5
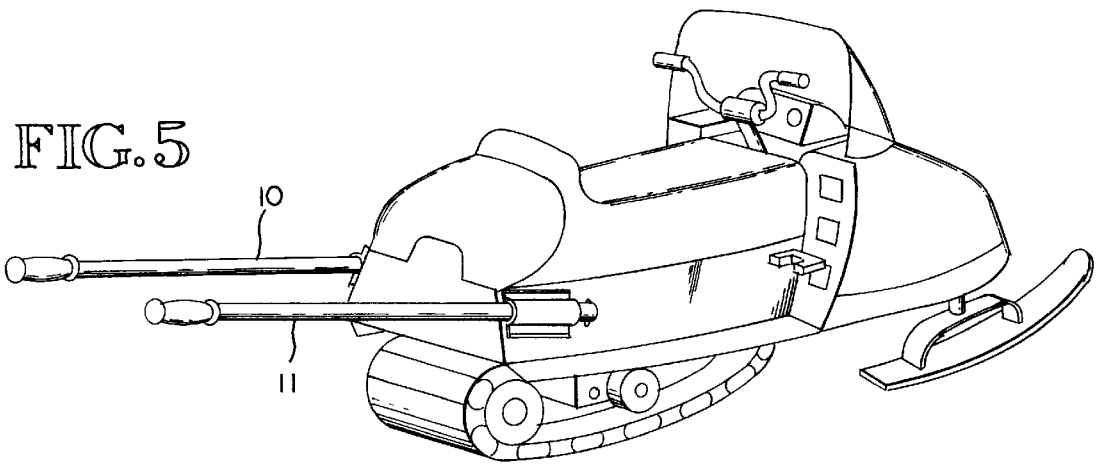
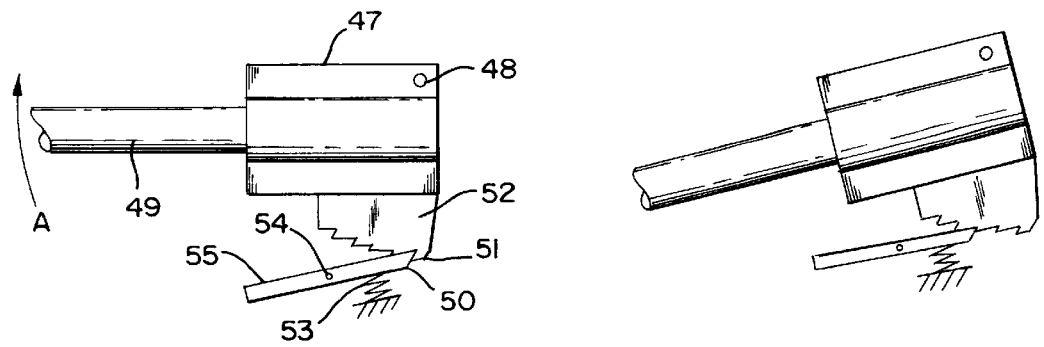
FIG. 6
FIG. 6A

ADJUSTABLE POSITION HANDLE ASSEMBLIES FOR SNOWMOBILE

This application is a Continuation-In-Part application based on application Ser. No. 08/229,201, filed Apr. 18, 1994 and to be abandoned when the subject application is duly filed.

BACKGROUND OF THE INVENTION

1. Field

The subject invention is in the field of handles provided to reduce the forces required to move or manipulate an object, an apparatus or the like. Such handles are levers of the various classes. Specifically, the subject invention is in the field of handles for use in easing the management of vehicles, more specifically snowmobiles.

2. Prior Art

There is much prior art in the field of handles used on vehicles, the patents listed below showing a few examples.

| U.S. Pat. Nos.: | 2,416,016 | 4,353,563 |
|---|---|---|
| | 3,436,778 | 4,641,874 |
| | 3,785,541 | 5,257,892 |

It has been well known for many years that snowmobiles occasionally and, under some use circumstances, frequently become stuck or stalled such as in irregularities in terrain and that it is difficult to move them back onto smoother terrain. It is also well known that the positional attitude of a snowmobile stuck or stalled in irregular terrain is unpredictable and therefore that any grips or handles installed on the snowmobile to facilitate reorienting the snowmobile to a useful attitude may not be accessible or are in awkward locations, rendering them of limited or no use. In spite of these long-standing problems, there is no apparatus known to the inventor of the subject invention provided for easing the management of snowmobiles, particularly when the snowmobile is in an unusual attitude. Accordingly, the primary objective of the subject invention is to provide for snowmobiles handles which facilitate moving snowmobiles out of undesirable situations even though the snowmobile is in an unusual attitude. Another objective is that the handles not innterfere with use of the snowmobile. Other objectives will be apparent from the following descriptions of the invention.

SUMMARY OF THE INVENTION

The subject invention is a handle assembly for a snowmobile. Two of the handle assemblies facilitate manual movement of the snowmobile. The handles of the assemblies are extendable/retractable and are adjustable to various angular positions relative to the snowmobile. They may be original equipment or retrofitted. They may also be removable/attachable with appropriate modifications of the snowmobile to accommodate the handles. In a preferred embodiment the handles, in their in-use state, extend from the back of the snowmobile and their lengths are such that the force required to lift the rear end of the snowmobile is considerably less than the force needed to lift the end without the handles. The force required to lift the end of a snowmobile is in the range of 50 percent to 85 percent of the force required to lift the end of the snowmobile by direct contact. Further, the handles make it more feasible for more than one person at a time to participate effectively in moving the snowmobile. The handle assembly comprises an attachment pad assembly which is attached to the snowmobile and accommodates the handle such that the shank of the handle slides through the pad assembly to allow extension and retraction of the handle and such that the direction of the handle relative to the snowmobile is adjustable. Handle assemblies may be attachable to either or both ends of the snowmobile.

The invention is described in more detail below with reference to the attached drawings.

BRIEF DESCRIPTION OF THE DRAWINGS

FIG. 1 illustrates one embodiment of the subject invention ready for use.

FIG. 2 illustrates the embodiment of FIG. 1 with the handles in their stowed state.

FIG. 3 illustrates the details of the attachment assembly.

FIG. 4 is an exploded view of the assembly in FIG. 3.

FIG. 5 illustrates the invention ready for use with one handle set low (essentially horizontal) and the other set angled upward.

FIGS. 6 and 6A are schematic views of an attachment assembly incorporating a ratchet.

DETAILED DESCRIPTION OF THE INVENTION

The subject invention is handle assemblies for a snowmobile comprising handles which facilitate manual movement of the snowmobile. One embodiment of the invention is shown in FIG. 1, with the handles in their in use state. Handles 10 and 11 extend rearwardly from snowmobile 12 and upwardly such that grips 13 and 14 at ends 15 and 16 respectively of handles 10 and 11 are generally at hand level of a standing person. Each handle is slidably attached to the snowmobile by a pad assembly, assembly 17 being visible in this view. The pad assembly, and therefore the handle 11 is attached to side 18 of the snowmobile. The attachment assembly, described in more detail below, is such that the handle 11 can slide lengthwise through the attachment assembly between the in use condition shown in FIG. 1 and the stowed condition illustrated in FIG. 2. The handles are put in their stowed state by sliding them through the attachment assemblies until the grips are close to the attachment assemblies.

In use, with the handles extended to their in use condition, the force required on the grips to lift the end of the snowmobile is obviously considerably less than would be required if the forces were applied directly to to the rear of the snowmobile. Also, such lifting is often needed when the snowmobile has come to rest in a hole or rut with the snowmobile tilted fore and aft and/or sidewise and the adjustment of the directions of extension of the handles from the snow-mobile can render the grips more accessible from relatively level terrain.

In FIG. 2 the snowmobile is shown with the handles in their stowed state. Fittings 19 and 20, with fitting 20 showing in this view are attached at ends 21 and 22 respectively of the tubes to prevent the handles from being pulled out of the attachment assemblies when the handles are extended. Also, the fittings engage clips 23 and 23' (23 showing) to lock the handles in their stowed state since inadvertent extension of one or both handles during use of the snowmobile is not acceptable.

FIG. 3 illustrates the attachment assembly 17 in more detail with handle 11 attached by the assembly. The assembly comprises a base 24 and a bracket 25 having flanges 26 and 27 and a U-shaped center section 28 which fits over the handle with surfaces 29 and 30 lying in a plane tangent to the handle. The flanges fit in slots 31 and 32 in the base, the slots being formed by bending the base material back over itself as shown. The base is attached to side 19 by flat headed fasteners, seen in detail in FIG. 4. The bracket is held in place by locking pins 33 and 34. Pin 33 serves as a pivot connection between the base and bracket. Pin 34 can be inserted in any of holes 35, 36 or 37 through a hole in a flange of the bracket. The direction of extension of the handle from the snowmobile is selected by pivoting of the bracket and handle about pin 33 and inserting pin 34 in a selected hole.

FIG. 4 is an exploded view of the attachment assembly with parts numbered as in FIG. 3. The base is attached to the snowmobile by fasteners, fastener 38 being typical in holes 39, 40, 41 and 42. Pins 33 and 34 are commercially available locking pins in which detent balls, ball 43 being typical are operable by pin 44 to extend and lock the pin in place or retract to allow removal or installation of the pin.

FIG. 5 illustrates the invention in use with handle 10 set low and handle 11 angled upward, numbered as in previous figures.

Attachment assembly 45 in FIG. 2 and a second on the other side of the snowmobile enable installing the handles on the front end of the snowmobile, handle 46 being shown by phantom lines.

In another embodiment of the invention the attachment assembly is pivotally connected to the snowmobile and a ratchet mechanism restrains the pivoting of the assembly so that upward force on the handles lifts the snowmobile to the extent the operator can lift it under the circumstances. The handles can then be lowered without lowering the snowmobile and the ratchet reengages to allow further lifting of the snowmobile. This re-engagement can be effected either by blocking the snowmobile up at the height achieved with the initial lift and then resetting the handles or the initial lift can be done such that resetting can be done while the momentum of the upward motion holds the snowmobile up as the resetting occurs.

FIGS. 6 and 6A are a schematic view of an attachment assembly incorporating a ratchet. In FIG. 6 attachment assembly 47 is pivoted to a snowmobile at 48 and motion of handle 49 in the upward direction as indicated by arrow A is prevented by engagement of pawl 50 in tooth 51 of rack 52. The panel is urged into engagement by spring 53. The pawl is pivoted at 54 and extension 55 is a handle for manual operation of the panel. FIG. 6A shows the attachment assembly and handle reset at a lower position to enable lifting the snowmobile further.

In alternate embodiments the handles may be inside the shell of the snowmobile in their stowed state. In still other embodiments the handles are separate items insertable into attachment assemblies built into or onto the snowmobile to accommodate the use of the handles.

It is considered to be understood from this description that the subject invention meets its objectives. It provides handles for a snowmobile to facilitate moving the snowmobile out of undesirable situations. Also, the handles are stowable and lockable in the stowed condition so that they do not interfere with use of the snowmobile and are angularly adjustable in their use conditions.

It is also considered to be understood that while certain embodiments of the subject invention are described herein, other embodiments and modifications of those described are possible within the scope of the invention which is limited only by the attached claims. For example, the relative motion between base 24 and bracket 25 in FIG. 3 can be controlled by a camming mechanism or by set screws.

I claim:

1. In combination, two adjustable position handle assemblies and a snowmobile, said snowmobile having first and second ends, each of said ends having a weight, each of said handle assemblies comprising:

an attachment assembly and a handle having a length, an end and a grip at said end, said attachment assembly being attachable to said snowmobile and comprising means for attaching said handle to said attachment assembly such that said handle is slidable through said attachment assembly over said length, said attachment assembly further comprising means for angular adjustment of said handle to said snowmobile.

2. The handle assemblies and snowmobile of claim 1 in which said length of each handle is such that the force on said grip required to lift one of said first and second ends is in the range of 50 percent to 85 percent of said weight of said end.

3. The handle assemblies and snowmobile of claim 1 in which said means of angular adjustment of each of said handle on said snowmobile comprises a ratchet mechanism.

* * * * *